United States Patent [19]

Tanaka et al.

[11] 4,406,974
[45] Sep. 27, 1983

[54] BEAM-INDEXING COLOR PICTURE TUBE

[75] Inventors: Tatsuo Tanaka, Kyoto; Takashi Nakakado, Takatsuki, both of Japan

[73] Assignee: Sanyo Electric Co., Ltd., Osaka, Japan

[21] Appl. No.: 307,681

[22] Filed: Oct. 1, 1981

[30] Foreign Application Priority Data

Oct. 7, 1980 [JP] Japan .................................. 55-140759

[51] Int. Cl.³ .......................... H01J 29/89; H01J 29/96
[52] U.S. Cl. ........................................... 315/3; 313/471
[58] Field of Search ........................ 315/3, 10, 12 ND; 313/471; 358/69

[56] References Cited

U.S. PATENT DOCUMENTS 3,444,413  5/1969  Harrold ................................ 313/471
4,194,140  3/1980  Hamano et al. ...................... 313/471
4,259,687  3/1981  Shinkai et al. ....................... 358/69 X Primary Examiner—Eugene La Roche
Attorney, Agent, or Firm—Armstrong, Nikaido, Marmelstein & Kubovcik

[57]  ABSTRACT

A beam-indexing color picture tube includes a gun for producing an electron beam that scans across a screen of the tube and a plurality of index phosphor stripes provided on the screen for emitting near-ultraviolet index lights. The near-ultraviolet index lights are transmitted through a window formed in the tube to a detector. The detector is formed by a planar fluorescent collector doped with fluorescent material for absorbing the near-ultraviolet index lights, and at the same time, generating secondary index lights having different wavelength than that of the near-ultraviolet index lights. A silicon p-i-n photodiode is mounted on the planar fluorescent collector for detecting the secondary index lights and for generating electrical signal representing the near-ultraviolet index lights.

21 Claims, 14 Drawing Figures

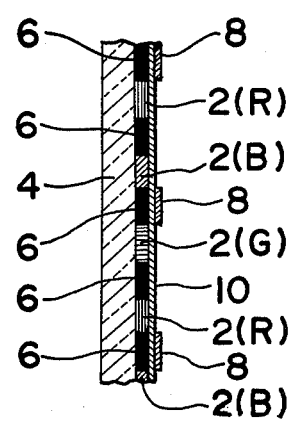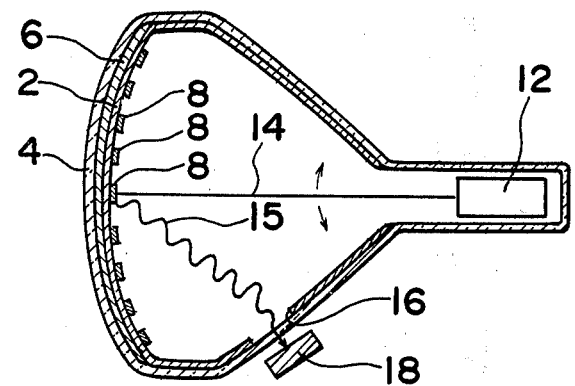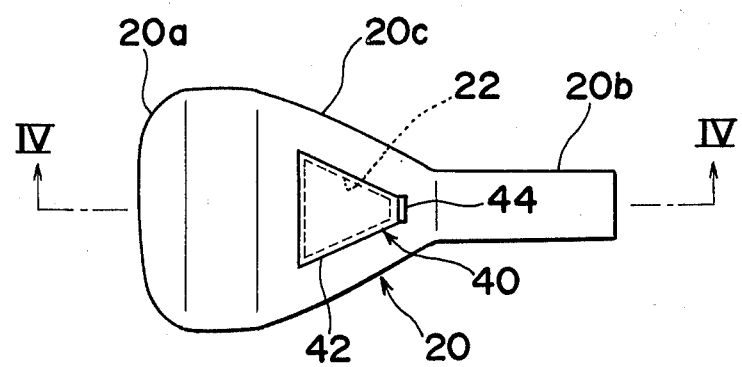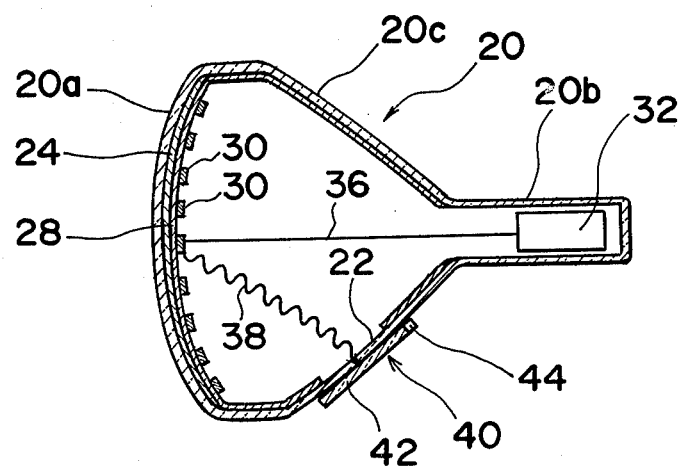

BEAM-INDEXING COLOR PICTURE TUBE

The present invention relates to a beam-indexing color picture tube and, more particularly, to an improvement of a detector employed therein for detecting index light signals.

Generally, a beam-indexing color picture tube has, as shown in FIG. 1, a repeating pattern of red, green and blue phosphor stripes 2 (In FIG. 1, a capital letter in parenthesis indicate color.) vertically arranged on inside face of a faceplate 4 with a black guardband 6 provided between each two neighboring phosphor stripes 2 to separate the phosphor stripes 2. Index stripes 8, made of a phosphor, are provided on an aluminum metal back 10 in alignment with the guardband 6 with a predetermined pitch, and in the example shown in FIG. 1, the index stripes 8 are aligned with every second guardband 6.

The beam-indexing tube operates, as shown in FIG. 2, with only one gun 12, which shoots an electron beam 14 that scans horizontally across the face of the tube. The gun 12 is operated by signals of color information which must be fed in the correct time sequence, that is the red color signal must be fed in when the electron beam is striking the red phosphor stripes 2(R), the same principle applying in the case of the green and blue signals.

The correct time sequence is controlled by the index stripes 8. When the electron beam 14 scans across the index phosphor stripes 8, it generates a series of light pulses 15, usually having a wavelength around 400 nm. The light pulse series 15 passes through a window 16 in the cone of the tube and is detected by a photodetector 18 provided on the outside of the tube. The light pulse series 15 is converted to a series of electrical pulses, serving as an indexing signal, and then it is fed to a circuit, where it serves to ensure that the appropriate color signal is inserted at the right time.

Since the distance between the window 16 and the beam striking spot, from which the light pulse is generated, and the incident angle of the light pulse into the photodetector 18 varies during the beam scan, the intensity of ight pulse at the photodetector 18 changes in wide range from weak to strong.

Therefore, in order to ensure the detection of all the light pulses, the photodetector 18 requires a high sensitivity and from this point of view, a photo-electric-tube or a photomultiplier-tube having a photo-electric plate sensitive to the near-ultraviolet light has been used. The photoelectric-tube or photomultiplier-tube is, however, a special electron tube which operates with high voltage and is large in size. Furthermore, it is expensive.

Approaches have been made to replace the photoelectric-tube or photomultiplier-tube with a semiconductor photodiode to eliminate the demerits described above. To accomplish such approaches, various problems must be solved, and one problem is the size of photosensitive area available on the semiconductor photodiode. The available photosensitive area on the semiconductor photodiode is normally considerably small, and if it is made large, the junction capacitance increases to prolong the response time, losing the ability of discrimination between light pulses received at high frequency.

Another problem is the spectral response characteristic of the semiconductor photodiode. The silicon photodiodes available at hand are sensitive highest to the light in a wavelength around 900 nm, and thus the near-ultraviolet light pulse from the index phosphor stripe will not be detected effectively. Although approaches have been made to develop a semiconductor photodiode sensitive to near-ultraviolet region by forming a shallow junction depth or by forming a heterojunction with $SnO_2$ or the like material, there still exists problems to be solved before it is ready for the production.

Since there are above described problems, it is very difficult, at present, to form a photodiode having high sensitivity to near-ultraviolet light and fast response, solely by a semiconductor, that is without using an additional member that can collect or intensify the light from the index phosphor stripes.

In many fields, the collection of light is carried out by a lens, but in the case of beam-indexing color tube, it is very difficult from the structural points that the incident angle of light pulse to the photodetector varies in wide range and that the location of the photodetector must be apart from the center axis of the screen.

Recently, an improved photodetector is proposed. It includes a hemispherical lens positioned between the window and a p-i-n photodiode. This arrangement has, however, a disadvantage described in the above paragraph.

Another photodetection method is proposed and it includes four sets of photodetectors each consisting of a hybrid circuit with a p-i-n photodiode and a preamplifier. The photodetectors are attached at four windows on the picture tube cone at four quadrants to pick up the light signal from the corresponding quadrants of the faceplate. This proposed photodetector is disclosed in a magazine "ELECTRONICS" issued July 14, 1981. This photodetection method has such a disadvantage that it requires many electronic parts and many works, resulting in high manufacturing cost.

Accordingly, it is a primary object of the present invention to provide a beam-indexing color picture tube having an improved photodetector for detecting the index light signal from every spot of the screen with high sensitivity.

It is another object of the present invention to provide a beam-indexing color picture tube of the above described type which is simple in construction and can be readily manufactured at low cost.

In accomplishing these and other objects, a beam-indexing color picture tube according to the present invention comprises a transparent window formed on the picture tube cone for permitting first index light signal emitted from index phosphor stripe to pass therethrough, and a planar fluorescent collector mounted on the window for receiving the first index light signal. The planar fluorescent collector has a fluorescent material doped therein for absorbing the first index light signal and for generating second index light signal having a wavelength different from that of the first index light signal. The beam-indexing color picture tube further comrpises a photodetector mounted on the sideface of the planar fluorescent collector for receiving the second index light signal and for generating electrical signal representing the first index light signal.

These and other objects and features of the present invention will become apparent from the following description taken in conjunction with a preferred embodiment thereof with reference to the accompanying drawings, in which:

FIG. 1 is an enlarged cross-sectional view of a screen portion of a beam-indexing color picture tube of prior art;

FIG. 2 is a cross-sectional view of a beam-indexing color picture tube of prior art;

FIG. 3 is a side plan view of a beam-indexing color picture tube according to the present invention;

FIG. 4 is a cross-sectional view taken along a line IV—IV shown in FIG. 3;

Figure 5:
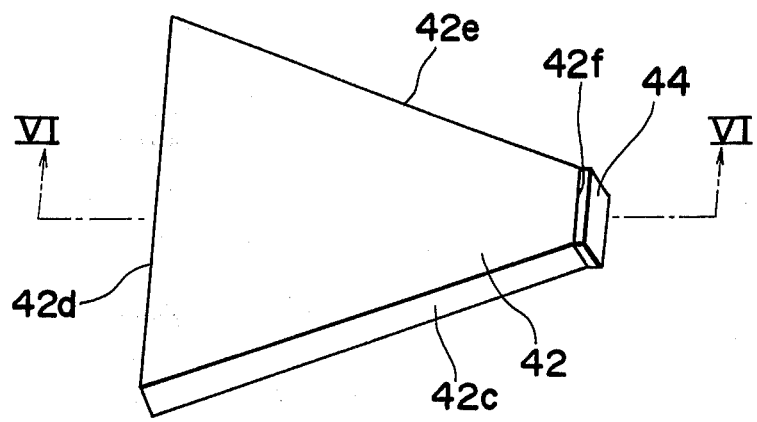
FIG. 5 is a perspective view of a planar fluorescent collector.

Referring to FIG. 3, there is shown a side plan view of a beam-indexing color picture tube 20 of the present invention. The tube 20 has a screen portion 20a, a neck portion 20b and cone portion 20c. A window 22 having a configuration of trapezoid or truncated triangle, shown by a dotted line, is provided in the cone portion 20c such that the base of the triangle window 22 is located close to the screen portion 20a and the truncated end is located close to the neck portion 20b.

Referring to FIG. 4, there is shown an inside of the tube 20, and in which there are provided a repeating pattern of vertical red, green and blue phosphor stripes each of which is separated from the other by a black guardband in a similar manner described above in connection with FIG. 1. These phosphor stripes and guardbands are located at 24 and are overlaid by an aluminum film 28, bearing a stripe of index phosphor 30 over, e.g., every second black stripe. A gun 32 produces an electron beam 36 which scans horizontally across the screen of the tube 20 sweeping over the color phosphor stripes and index phosphor stripes 30. When the electron beam 36 spots on the index phosphor stripe 30, a near-ultraviolet light signal 38 is emitted therefrom, and a part of which is taken out from the tube 20 through the window 22.

Referring both to FIGS. 3 and 4, the window 22 is mounted with a detector 40 for detecting the index light signal 38. The detector 40 includes, as best shown in FIG. 5, a planar fluorescent collector 42 having a configuration similar to but slightly greater than that of the window 22, and a photodetector, e.g., a silicon p-i-n photodiode 44 mounted at the truncated end of the planar fluorescent collector 42.

The planar fluorescent collector 42 is formed by an optically transparent medium, for example, a transparent synthetic resin doped with an appropriate amount of fluorescent material 46. The planar fluorescent collector 42 is defined by opposite flat faces 42a and 42b, as shown in FIG. 6, parallel with each other, and side faces 42c, 42d, 42e, and 42f, which are all in right angle with the flat faces 42a and 42b.

Figure 6:
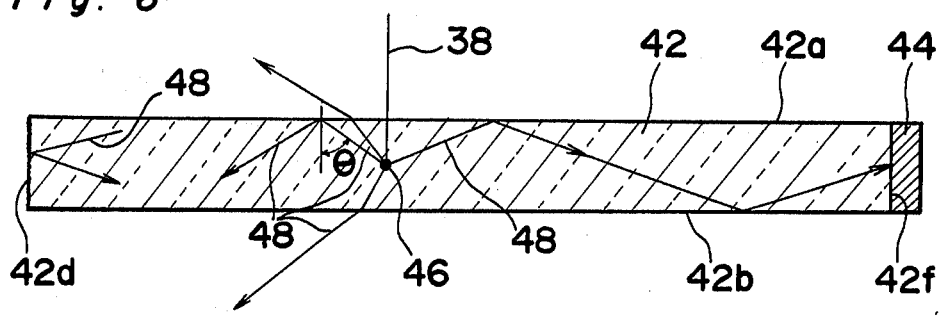
FIG. 6 is a cross-sectional view taken along a line VI—VI shown in FIG. 5.
Figure 7A:
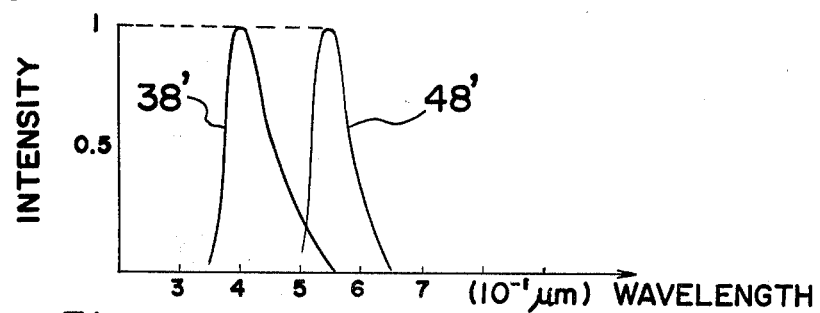
FIG. 7a is a graph showing spectra of index light obtained from index phosphor stripe and light generated by fluorescent material.

Referring to FIG. 6, when the planar fluorescent collector 42 receives the index light signal from the index phosphor stripe 30, the fluorescent material 46 absorbs the near-ultraviolet light 38, and in turn, it generates light 48 (hereinafter referred to as generated light 48) having a wavelength longer than that of the near-ultraviolet light 38. FIG. 7a shows a spectra of the near-ultraviolet light 38 and the generated light 48, in which abscissa represents wavelength and ordinate represents normalized intensity. In FIG. 7a, a curve 38' is obtained by the analization of the near-ultraviolet light 38 emitted from the index stripe 30 of P47 (A phosphor denominated by Joint Electron Device Engineering Council, and its formula is $Y_2SiO_5:Ce$) and a curve 48' is obtained by the analization of the generated light 48.

Still referring to FIG. 6, the generated lights 48 from the fluorescent material 46 direct in all directions, and thus some light direct towards opposite flat faces 42a and 42b and some direct towards side faces. Of the lights directed towards opposite flat faces 42a and 42b, those having incident angle $\theta$ to the opposite faces smaller than critical angle go out from the planar fluorescent collector 42, but those having incident angle $\theta$ greater than the critical angle are reflected losslessly in turns, on the opposite faces and are trapped in the planar fluorescent collector 42. Furthermore, the generated lights 48 directed to the side faces 42c, 42d and 4e are partially reflected and are also trapped in the light collector 42. The ratio L of the amount of lights that go out from the planar fluorescent collector 42 to the amount of generated lights can be given as follows:

$$L = \left(1 - \frac{\sqrt{n^2 - 1}}{n}\right) \quad (1)$$

wherein n is refractive index of the transparent medium. When n=1.5, the ratio L is approximately equal to 0.25. This means that about 75% of the generated lights are trapped.

The trapped lights in the collector 42 make total reflection repeatedly inside the collector 42 and are directed towards the truncated face 42f. Since the collector 42 is tapered towards truncated face 42f, and if the other side faces 42c, 42d and 42e are deposited by high reflective material, such as an aluminum, the trapped lights reach the truncated face 42f with considerably less number of reflections carried out in the collector, resulting in less reduction of the light intensity. It is to be noted, however, that the collector 42 can be formed in any other configurations, for example, circle, semi-circle, or pollygon. The trapped lights that have reached the truncated face 42f pass through said face 42f and are detected by the photodiode 44 as an index signal.

Next, the description is particularly directed to the fluorescent material 46 to be doped in the transparent medium. Since the electron beam 36 from the gun 32 scans over the index phosphor stripes 30 at very high speed, the frequency of emitted light pulses 38 is very high, e.g., 10 MHz, and accordingly, the pulse spacing is very short, e.g., 100 nanoseconds. Therefore, unlike the fluorescent materials used in solar energy collectors and liquid crystal displays, the fluorescent material 46 to be doped in the medium must have such a characteristic that the generated light pulse from an index phosphor stripe should decay before the next light pulse 38 comes. In other words, the fluorescent material 46 to be doped in the medium must have a very short decay time to prevent the interference between successive pulses, thus improving the S/N ratio of the generated light. This is further explained below.

Figure 8A:
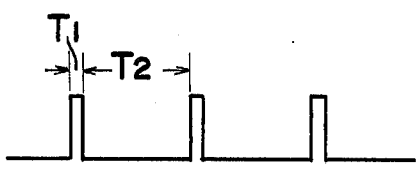
FIGS. 8a, 8b and 8c are waveforms of electron beam, indx light and generated light by the fluorescent material, respectively.

Referring to FIG. 8a, there is shown a time chart of beam scan in which the pulse duration $T_1$ represents a period in which the beam 36 strikes the index phosphor stripe 30 and a pulse interval period $T_2$ represents a period in which the beam 36 scans between the index phosphor stripes 30. As understood from the above, the pulse spacing ($T_1+T_2$) is 100 nanoseconds. When the beam 36 strikes the index phosphor stripe 30, i.e., during the period $T_1$, the index phosphor stripe 30 emits the light 38. The index phosphor stripe 30, however, continues to emit the light 38 even when the beam 36 is off from the index phosphor stripe 30.

Figure 8B:
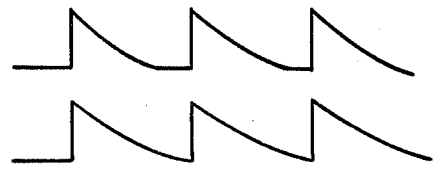
Figure 8C:

In the case where the index stripe 30 is formed by P47, the decay time is about 80 nanoseconds, and thus the waveform of the near-ultraviolet light 38 can be depicted as shown in FIG. 8b. Similarly, when the fluorescent material 46 receives the near-ultraviolet light 38, it generates light during the presence of the near-ultraviolet light 38 and also during its decay time, as shown in FIG. 8c. Since it is preferred to stop the light generation from the fluorescent material 46 before the next near-ultraviolet light 38 comes, the decay time of the fluorescent material 46, in this case, should be shorter than 20 nanoseconds.

In addition to above, the fluorescent material to be doped must have a high quantum efficiency q to increase the concentration ratio M of the planar fluorescent collector 42. The concentration ratio M is the ratio between the optical density of the output lights from the collector 42 and the optical density of the input lights to the collector 42, and can be theoretically expressed as follows.

$$M = (S/S') \times q(1-L) \qquad (2)$$

wherein S is an area of the collector 42 which receives light, and S' is an area of the collector from which the trapped light emits. For example, if the collector has a configuration of square plate (100 mm×100 mm×2 mm), refractive index n=1.5, and quantum efficiency q=0.90, and assuming that the collector receives light on its one square face and emits light from its entire side faces, the concentration ratio M can be calculated as follows:

$$M = \frac{100 \times 100}{2 \times 100 \times 4} \times 0.9 \times (1 - 0.25) = 8.4 \qquad (2')$$

This means that the optical density of the output lights coming out from the entire side faces is concentrated approximately by 8.4 times to that of the input lights to the square collector. It is needless to say that, during the concentration process, the wavelength of the input lights are changed. Since the collector 42 according to the embodiment described above has most of the side faces arranged to be high reflection, the lights that come out from the limited face, i.e., the truncated face 42f, can be further concentrated.

Figure 7B:
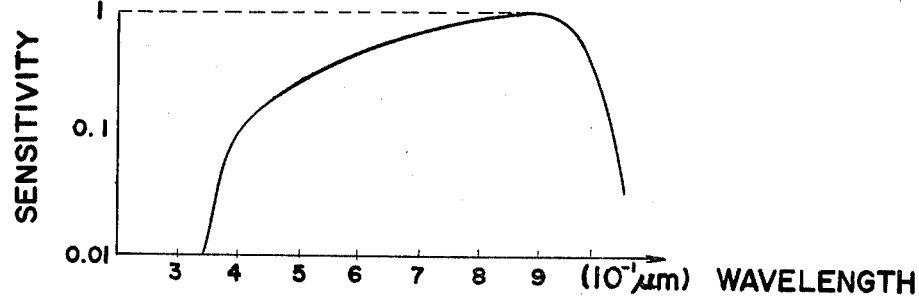
FIG. 7b is a graph showing spectral sensitivity of a typical silicon photodiode.

Furthermore, the fluorescent material to be doped in the medium should preferably have a high absorption coefficient of the near-ultraviolet light 38 and a high solubility with respect to the medium to disperse the fluorescent material uniformly in the medium. Moreover, the light generated from the fluorescent material must have a wavelength that falls in a high sensitive region of the photodiode to be used to ensure the detection of the generated light. FIG. 7b shows a high sensitive region of the silicon p-i-n photodiode 44, in which abscissa represents wavelength and ordinate represents normalized sensitivity.

The fluorescent materials that meets the above described requirements are available mainly in organic dye materials and some of which are listed below.

| Fluorescent Materials (Commercial Name) | Absorption Range (nm) | Emission Range (nm) | Decay Time (ns) |
|---|---|---|---|
| Hostasol Yellow 3G | 380–500 | 500–580 | less than 20 |
| Hostasol Yellow 8G | 370–490 | 490–570 | " |
| Macro-lex Fluorescent Yellow 10GN | 370–480 | 480–560 | " |
| Macro-lex Fluorescent Red GG (Hostasol Red GG) | 420–560 | 550–620 | " |
| Brilliant Sulfofravine | 360–480 | 480–580 | " |
| Pyronine G | 480–560 | 560–610 | " |
| Uranine | 410–530 | 530–590 | 8.1 |
| Rhodamine 6G | 480–560 | 560–610 | 3.9 |
| Thioflavin S | 320–450 | 420–580 | less than 20 |
| Acridine Yellow | 390–490 | 480–560 | 5.1 |
| Acridine Orange | 410–520 | 510–590 | 4.4 |
| Acid Red | 500–580 | 560–630 | less than 20 |
| Eosin Yellowish | 470–550 | 550–600 | 4.5 |
| Phloxine B | 490–580 | 560–630 | less than 20 |
| Rhodamine B | 490–580 | 540–630 | 3.2 |
| 3-aminofluoranthene | 300–490 | 480–680 | 12.4 |

In contrast to above, inorganic phosphors generally have a considerably long decay time. There are, however, several that meet the above described requirements, such as materials that contain $Ce^{3+}$ or $Nd^{3+}$.

Figure 9:
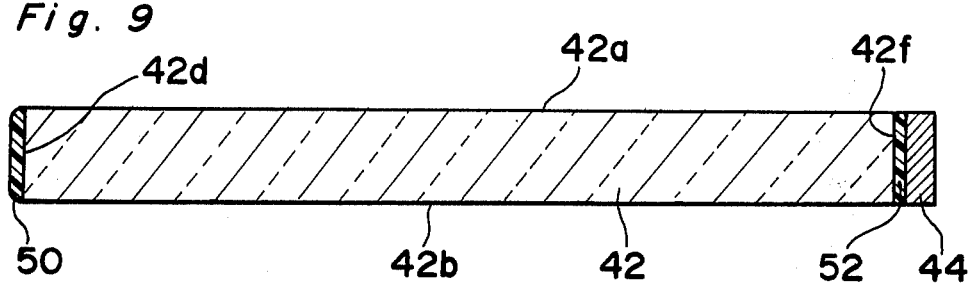
FIG. 9 is a view similar to FIG. 6, but particularly shows a modification thereof.

Next, the modification of the planar fluorescent collector 42 is explained. The side faces 42c, 42d and 42e can be finished as mirror reflection faces by the application of high reflective material, such as aluminum through vacuum deposition, or by the deposition of white powder, such as $TiO_2$ or MgO mixed in an epoxy adhesive material 50, as shown in FIG. 9. The latter has an advantage in reducing the processing time and thus reducing the manufacturing cost.

Still referring to FIG. 9, it is preferable to provide a filler 52 between the truncated face 42f and the photodiode 44 to improve the transmission of generated light 48 to the photodiode 44. The filler 52 has a refractive index approximately equal to that of the planar fluorescent collector 42. Furthermore, the filler 52 should be tightly applied to the truncated face 42f and to the surface of the photodiode 44 to prevent the introduction of any air gap between the truncated face 42f and the photodiode 44. In the case where there is an air gap between the filler 52 and the truncated face 42f or photodiode 44, the generated lights are reflected at the boundary to reduce the rate of transmission. For example, when the refractive index of the planar fluorescent collector 42 and the filler 52 is 1.5, about 4% of the light directed perpendicularly to the boundary will be reflected at the interfaces between collector 42 and air gap, or air gap and filler 52, and this percentage increases as the increase of the incident angle of light to the boundary.

Since the photodiode is usually formed by a silicon wafer and a transparent guard material deposited therearound, it is preferable to match the refractive index of the filler 52 with that of the guard material. This can be achieved either by selecting a photodiode that uses the guard material having a desired refractive index, i.e., the refractive index identical to that of the filler 52, or by employing the filler 52 and the planar fluorescent collector having the same refractive index as that of the guard material.

When the filler 52 is employed, very small percentage of generated lights are reflected at the interface between the truncated face 42f and the photodiode 44. Furthermore, since the lights directed to the side faces of the filler 52 with the incident angle greater than critical angle will be totally reflected thereat, very small percentage of lights will leak out from the filler 52. This leakage can be reduced by narrowing the thickness of the filler 52, i.e., the distance between the truncated face 42f and the surface of the photodiode 44.

Figure 10:
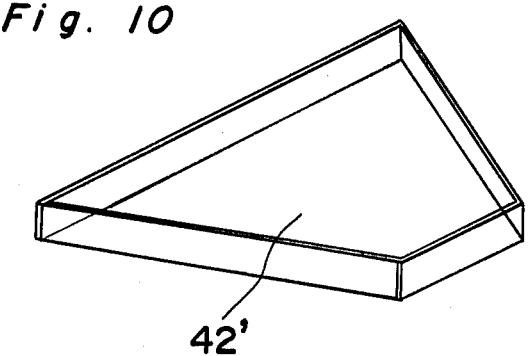
FIG. 10 is a view similar to FIG. 5, but particularly shows a modification thereof.

Referring to FIG. 10, there is shown a modified planar fluorescent collector 42' which includes a container formed by transparent plate, such as glass or plastic, and having a configuration similar to the planar fluorescent collector 42 described above in connection with FIG. 5. The container is filled with solution of the above described fluorescent material. The solvent for the fluorescent material can be water or alcohol.

Figure 11:
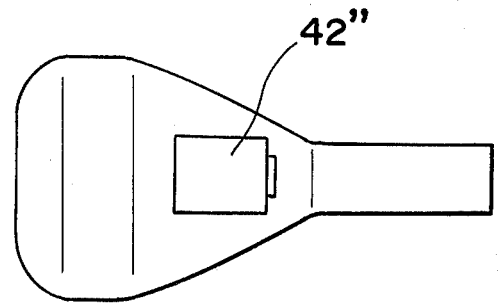
FIG. 11 is a view similar to FIG. 3, but particularly shows a modification thereof.

Referring to FIG. 11, there is shown a further modified planar fluorescent collector 42" which has a rectangular configuration.

According to the present invention, since the planar fluorescent collector 42 changes the wavelength of the near-ultraviolet light pulses 38 to a longer region and, at the same time, intensifies the light pulses, the p-i-n photodiode 44 can detect the indexing signal with high reliance. Furthermore, since the fluorescent material 46 to be doped in the planar fluorescent collector 42 is selected to meet the following requirements:

(1) having a high absorption coefficient of light pulse emitted from the index phosphor stripes 30;
(2) having a very short decay time;
(3) having a high quantum efficiency, i.e., high rate of generation of light in response to the received light;
(4) generating lights having wavelength in a region corresponding to the sensitive region of the photodetector; and
(5) having a high solubility with respect to the material that forms the planar fluorescent collector, the index signal can be detected by the p-i-n photodiode 44 with high accuracy without causing any interferences between the successively coming index pulse signals.

Although the present invention has been fully described with reference to the accompanying drawings, many modifications and variations thereof will now be apparent to those skilled in the art, and therefore, the scope of the present invention is to be limited not by the details of the preferred embodiment described above, but only by the terms of appended claims.

What is claimed is:

1. In a beam-indexing color picture tube having a gun for producing an electron beam that scans across a screen of the tube, a plurality of index phosphor stripes provided on said screen for emitting first index light signal as the beam spots on said index phosphor stripe, and a detector for detecting the first index light signal, an improvement wherein said detector comprises:

a transparent window formed on said tube for permitting said first index light signal to pass therethrough;

a planar fluorescent collector mounted on said window for receiving said first index light signal, said planar fluorescent collector having fluorescent material doped therein for absorbing said first index light signal and for generating second index light signal having a wavelength different from that of said first index light signal; and a photodetector mounted on said planar fluorescent collector for receiving said second index light signal and for generating electrical signal representing said first index light signal.

2. A beam-indexing color picture tube as claimed in claim 1, wherein said fluorescent collector is defined by a pair of flat faces parallel to each other and side faces extending between edges of said flat faces in a perpendicular relation to said flat faces.

3. A beam-indexing color picture tube as claimed in claim 2, wherein said photodetector is mounted on a portion of said side faces.

4. A beam-indexing color picture tube as claimed in claim 3, wherein said side faces other than said portion thereof are deposited with high reflective material.

5. A beam-indexing color picture tube as claimed in claim 4, wherein said high reflective material is a film of aluminum.

6. A beam-indexing color picture tube as claimed in claim 4, wherein said high reflective material is an adhesive material mixed with white powder.

7. A beam-indexing color picture tube as claimed in claim 6, wherein said white powder is a substance selected from the group consisting of $TiO_2$ and MgO.

8. A beam-indexing color picture tube as claimed in claim 2, 3, 4, 5, 6 or 7, wherein said flat faces have a configuration of rectangular.

9. A beam-indexing color picture tube as claimed in claim 2, 3, 4, 5, 6 or 7, wherein said flat faces have a configuration tapered towards a side face mounted with said photodetector.

10. A beam-indexing color picture tube as claimed in claim 9, wherein said flat faces have a configuration of a triangle having one corner truncated.

11. A beam-indexing color picture tube as claimed in claim 1, wherein said planar fluorescent collector has a chamber formed therein for receiging a solution of fluorescent material.

12. A beam-indexing color picture tube as claimed in claim 1, wherein said fluorescent material has a decay time shorter than 20 nanoseconds.

13. A beam-indexing color picture tube as claimed in claim 1, wherein said fluorescent material has a high absorption coefficient of said first index light signal.

14. A beam-indexing color picture tube as claimed in claim 1, wherein said fluorescent material has a high quantum efficiency.

15. A beam-indexing color picture tube as claimed in claim 1, wherein said fluorescent material has a high solubility with respect to the material that forms the planar fluorescent collector.

16. A beam-indexing color picture tube as claimed in claim 1, wherein said second index light signal has a wavelength within a region sensitive to said photodetector.

17. A beam indexing color picture tube as claimed in claim 1, wherein said photodetector is formed by a semiconductor.

18. A beam-indexing color picture as claimed in claim 1, wherein said photodetector is silicon p-i-n photodiode.

19. A beam-indexing color picture tube as claimed in claim 1, wherein said window has a configuration similar to but slightly smaller than said planar fluorescent collector.

20. A beam-indexing color picture tube as claimed in claim 1, further comprising a filler provided between said planar fluorescent collector and said photodetector, said filler having a refractive index approximately equal to that of said planar fluorescent collector to reduce the reflection at an interface between the planar fluorescent collector and photodetector.

21. A beam-indexing color picture tube as claimed in claim 20, wherein said photodetector comprises a silicon p-i-n photodiode and a guard material deposited therearound, and wherein said filler has a refractive index approximately equal to that of the guard material.

* * * * *